Sept. 15, 1964  R. C. WOODWARD, JR  3,148,560
VARIABLE SPEED DRIVE MECHANISM UTILIZING BELTS AND PULLEYS
Filed Nov. 5, 1962  3 Sheets—Sheet 3
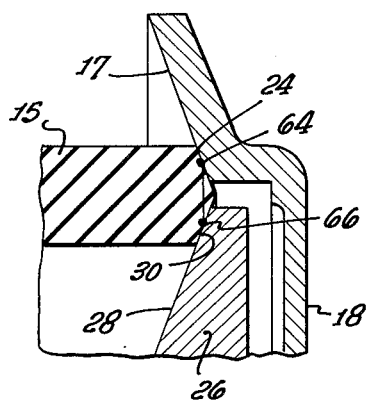
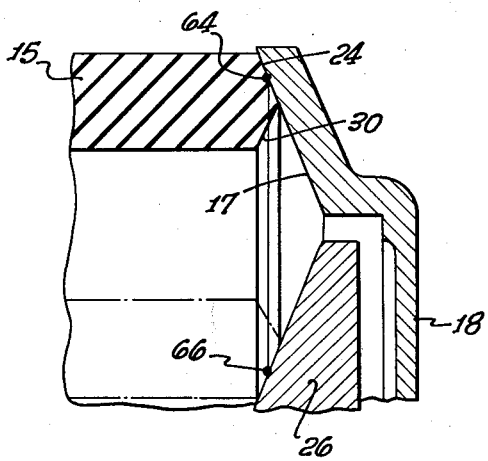
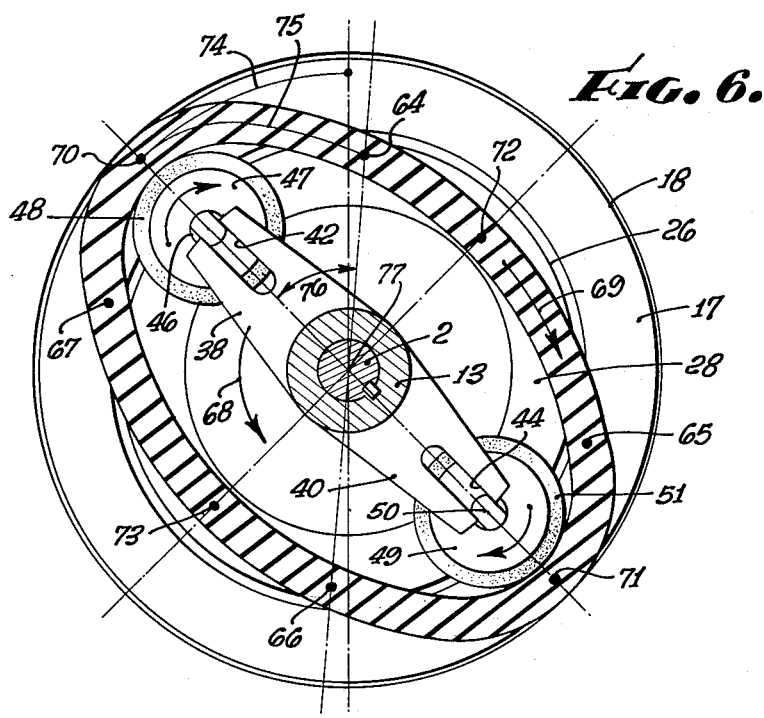
INVENTOR.
RICHARD C. WOODWARD, JR.
BY
Flam and Flam
ATTORNEYS.

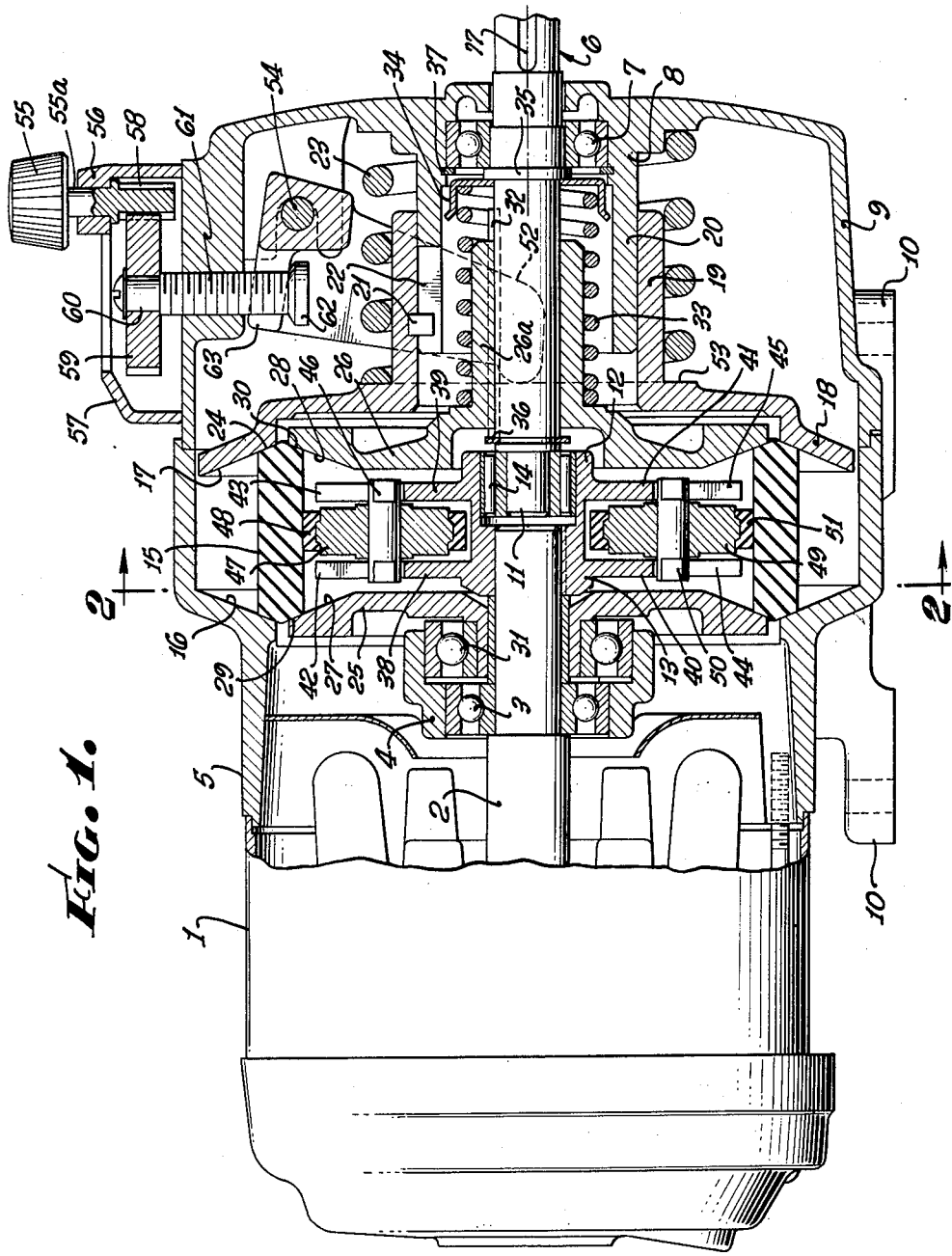

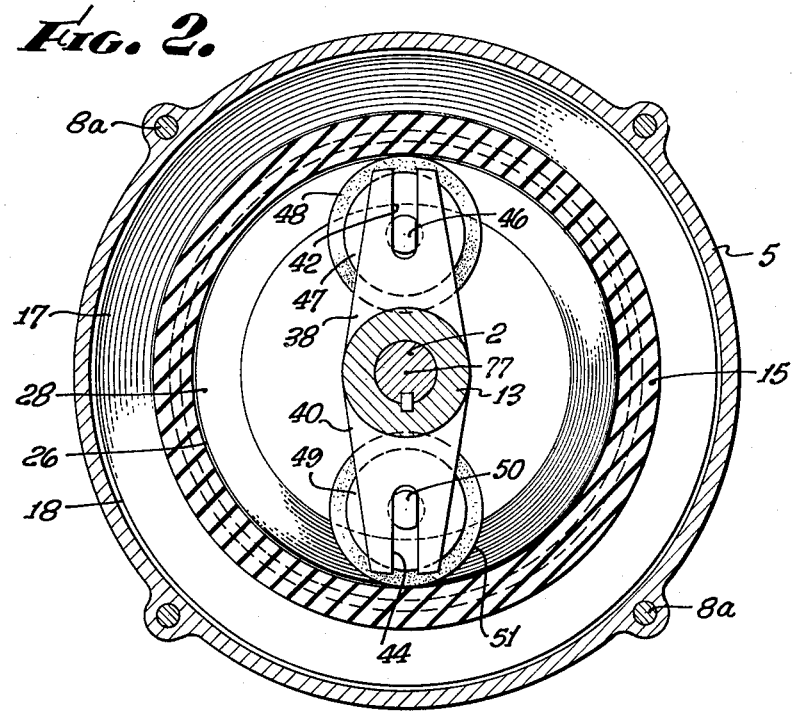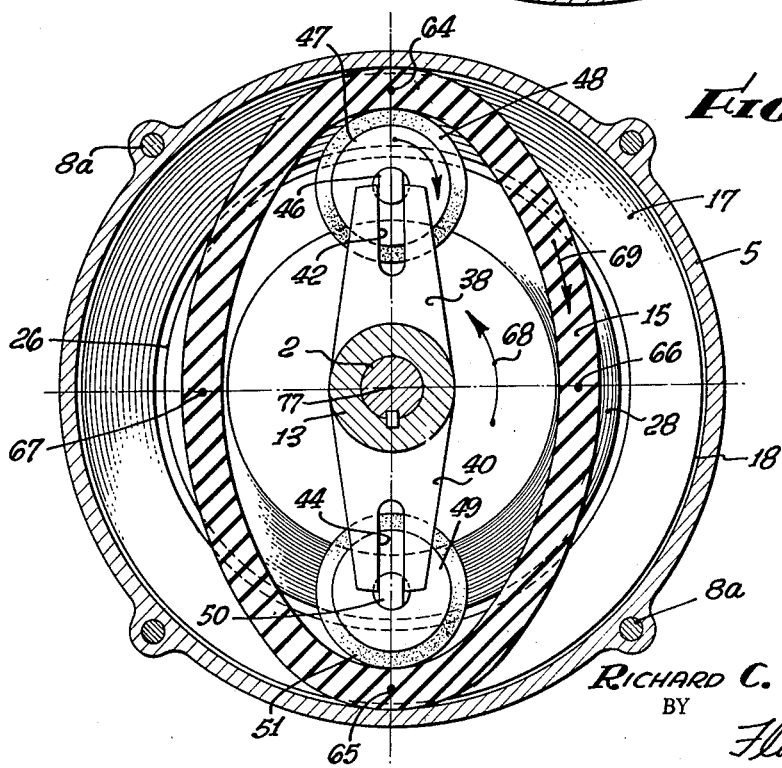

United States Patent Office 3,148,560
Patented Sept. 15, 1964

3,148,560
VARIABLE SPEED DRIVE MECHANISM
UTILIZING BELTS AND PULLEYS
Richard C. Woodward, Jr., Fullerton, Calif., assignor to
Emerson Electric Co., a corporation of Missouri
Filed Nov. 5, 1962, Ser. No. 235,453
12 Claims. (Cl. 74—796)

This invention relates to variable ratio transmission mechanisms, in which belts and pulleys are used.

One well-known form of mechanism for this purpose includes a pulley structure having a pair of opposed pulley sections, with inclined belt engaging faces. At least one of the pulley sections is axially adjustable so as to cause the belt to move radially inwardly or outwardly with respect to the axis of rotation of the pulley structure. The structure may be either the driving or driven member, the belt being in operative relation to another pulley structure.

Such mechanisms usually have a ratio range of limited extent. Thus, unless special supplementary elements are used, the mechanism is incapable of reducing the output speed to zero. Furthermore, it is necessary that the belt length be sufficient efficiently to engage the two pulley structures.

It is one of the objects of this invention to provide a compact mechanism of this general character, in which it is possible to bring the output speed to zero.

The physical embodiment described herein includes a pulley structure that has a sloping face cooperating with a belt. The belt at zero speed setting forms a stationary circular track for a pair of rollers eccentrically mounted on the axis of the input shaft. The rollers have axes at opposite ends of a diametrical line extending through the axis of the input shaft. There is then no material torque transmitted to the pulley face.

By appropriate adjustment of the mechanism, the rollers are permitted to move radially outwardly under the influence of centrifugal force, to cause the belt to assume a generally elliptical form, having a major and a minor axis. The belt at its minor axis now contacts the pulley structure at a radius closer to the axis of the structure. The belt is also linearly driven by aid of the rollers to cause a torque to be exerted on the pulley structure. By adjustment, the minor axis of the elliptical belt can be increased or decreased, respectively to decrease or increase the rate of rotation of the driven pulley structure.

The linear drive is effected in a novel manner. As shown herein, it is produced by aid of a non-rotary pulley section having a face that is contacted by the belt, so as to provide a frictional contact with the belt at limited areas at the ends of the major axis, thereby pulling the belt linearly at these points.

To make it possible to adjust the major and minor axes of the elliptical belt, the non-rotary pulley section is movable along the axis of the input shaft. A resilient force is provided to urge the belt into its circular form; but due to the wedging action of the belt as the rollers move radially outward, the pulley section is urged away from the belt, until limited by an adjustable stop.

Such a mechanism as hereinabove outlined is particularly applicable to reduce the space required for accommodating the device. This saving in space results from the coaxial arrangement of the driving and driven elements.

Accordingly, it is another object of this invention to provide a coaxial variable ratio drive utilizing an edge-active belt.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a view, mainly in longitudinal section, of an apparatus incorporating the invention, the apparatus being shown as set for zero speed;

FIG. 2 is a sectional view taken along a plane corresponding to line 2—2 of FIG. 1;

FIG. 3 is a view similar to FIG. 2 but illustrating the position of the apparatus set for maximum speed;

FIGS. 4 and 5 are enlarged sectional views diagrammatically illustrating the position of the belt for minimum and maximum speeds; and FIG. 6 is a view, mainly diagrammatic, for explaining the mode of operation of the device.

An electric driving motor 1 (FIG. 1) is shown as having a shaft 2 which serves as the input shaft for the mechanism. This shaft 2 is appropriately mounted in a bearing structure 3 having a bearing housing 4 forming a part of a stationary frame 5. This frame 5 is shown as having feet 10, by the aid of which the mechanism may be supported on a surface.

An output shaft 6 is shown as coaxially mounted with respect to the shaft 2. It is rotatably supported by a ball bearing structure 7 mounted in a housing 8. This housing 8 has a deep flange 9 within which are located some of the important elements of the device. Its left hand edge telescopes within the frame 5 and may be appropriately fastened thereto, as by bolts 8a (FIGS. 2 and 3).

The left hand end of shaft 6 has a reduced diameter 11 which is piloted in a hub 12. This hub is formed on a member 13 keyed to shaft 2 so as to be driven by that shaft. The reduced end 11 of shaft 6 is inserted within a needle bearing structure 14 having an outer race supported in the hub 12 and an inner race mounted on the shaft extension 11.

A belt loop 15 is provided which transmits the motion of shaft 2 to shaft 6 in a manner to be hereinafter described.

In the neutral position shown in FIGS. 1, 2 and 4, the belt loop 15 is circular, having an axis coincident with that of shafts 2 and 6. It is confined to the circular configuration by a pair of opposed tapered surfaces 16 and 17. These tapered surfaces converge outwardly. The tapered surface 16 is formed on the interior of the frame 5 and is non-rotary. The tapered surface 17 is likewise non-rotary but is axially adjustable by being formed on an adjustable member 18. This member 18 has a hub 19 which is slidable upon the hollow hub 20 formed integrally with the housing 8. The hub 19 may be appropriately provided with means to prevent angular movement with respect to the hub 20 as, for example, by aid of a pin 21 extending into a slot 22 in hub 20.

A relatively strong spring 23 surrounds the hub 19 to urge the member 18 toward the left hand end into contact with the outer tapered surface 24 of the belt 15.

The belt 15 in the position of FIGS. 1 and 4 is also uniformly urged in a radial direction to assume the circular form by a pair of rotary pulley sections 25 and 26. These pulley sections have outwardly diverging tapered or inclined faces 27 and 28. These faces engage the bevel surfaces 29 and 30 formed on the belt 15.

The pulley section 25 is freely rotatable in a ball bearing structure 31 mounted in the housing 4. The pulley section 26 has a hub 26a splined to shaft 6 by aid of a spline 32. A spring structure 33 surrounds the hub 26a and has its left hand end engaging the section 26; its right hand end is accommodated in a cup 34 abutting a collar 35 formed on shaft 6.

A split spring ring 36 maintains the spline 32 against removal and a similar split spring ring 37 maintains the ball bearing structure 7 against removal.

The member 13 is provided with a plurality of forks 38, 39, 40 and 41. The forks 38 and 39 are axially spaced apart and are in angular alignment with each other. The ends of the forks have slots 42 and 43. The pair of forks 40 and 41 are similarly provided with aligned slots 44 and 45. The forks 38, 39 are spaced 180° from the forks 40, 41.

The slots 42 and 43 of the aligned forks 38 and 39 serve to accommodate a pintle 46 having flattened ends guided in the slots 42 and 43. This pintle carries a freely rotatable roller 47 having a flexible friction facing 48. This facing 48 has an outer periphery in contact with the inner periphery of the belt loop 15.

The pair of forks 44 and 45 similarly accommodate a roller structure 49 by the aid of a pintle 50. The roller structure 49 has an outer flexible facing 51 in frictional contact with the interior surface of the belt loop 15.

When the shaft 2 is rotated, the rollers 47 and 49 move radially outwardly under the influence of centrifugal force and in contact with the interior surface of the belt loop 15.

The belt loop is confined to the circular form of FIG. 2 by restraining member 18 against rightward movement beyond a limit. This is effected by the aid of an adjustable shift fork 52 embracing the hub 19 and engaging a shoulder 53 formed on the rear surface of the member 18.

The fork 52 is pivotally mounted on a pin 54 appropriately supported in housing 8. Its position may be adjusted by turning a knob 55. This knob is attached to a shaft 55a mounted for rotary movement in a boss 56 formed as part of a cover member 57 supported on the top of the housing 8. The inner end of the shaft carries an integral pinion 58 meshing with a gear 59 attached to the upper end 60 of a screw 61. This screw 61 has a head 62 which engages in a slot 63 formed in the upper end of the shift fork.

When the knob 55 is turned, the screw 61 is correspondingly moved upwardly or downwardly so as to determine the position that the shift fork will take when it is urged toward the right by the surface 53.

For the setting illustrated in FIGS. 1, 2 and 4, the shaft 2 may be rotated at any speed, but there is no angular movement of the belt 15 as it is tightly clamped by the pressure exerted by the springs 23 and 33. The rollers 47 and 49 merely roll on the inner cylindrical surface defined by the belt 15.

In order to cause the transmission of motion to the pulley section 26, the shift fork 52 is allowed to move toward the right or in a counter-clockwise direction about its pivot shaft 54. This adjustment of the fork position is effected by moving the head 62 of screw 61 upwardly as viewed in FIG. 1.

At any adjustment rightward of fork 52, to maximum, the belt loop 15 assumes the elliptic-like configuration of FIGS. 3 and 6. The belt loop 15 is shown as occupying its maximum output speed condition. At the extremities of the major axis of the ellipse, the belt is now close to the outer edge of the surface 17, as indicated in FIG. 5. It is urged into this elliptic-like form by the centrifugal force exerted on the belt through the rollers 47 and 49.

At the extremities of the major axis, there are thus two relatively small areas of contact surrounding points 64 and 65 (FIGS. 3 and 5). At the extremities of the minor axis, there are also two areas of contact around points 66 and 67. This is due to the following discussion.

The surface 17 of member 18 slopes downwardly from the plane of the paper in FIG. 3 and radially inwardly from the points 64 and 65. Similarly, the surface 28 of pulley section 26 slopes downwardly from the plane of the paper and radially outwardly from points 66 and 67. The belt loop 15 is thus free of these surfaces 17 and 28 except at the ends of the major and minor axes. In the diagram of FIG. 5, the point 66 is shown as it would appear at the extremity of the minor axis, and in line with point 64 on the major axis.

Assuming rotation of shaft 2 in a counter-clockwise direction, as indicated by the arrow 68, the rollers 47 and 49 cause the belt loop 15 to move in a clockwise direction as indicated by the arrow 69. The original points of contact 64, 65, 66 and 67 move along the loop of belt 15, and new points are in succession brought in contact. For example, in the position of FIG. 6, corresponding to a 45° movement of shaft 2, the points in contact are now 70, 71, 72 and 73. This is effected by virtue of the frictional engagement between the roller facings 48 and 51.

The amount of linear movement that the belt 15 is moved in a clockwise direction is represented by the elliptic arc 75 joining point 70 and point 64. This arc 75 subtends an angle 76.

The linear length of arc 75 between the points 70 and 64 is equal to the arc length 74 which corresponds to the movement of the shaft 2 in a counter-clockwise direction by the angle represented by the arc 74. The angle 76 is greater than the angle of the arc 74. Therefore, the belt has been moved in a clockwise direction corresponding to the difference of these angles; that is, point 64 of the belt is now advanced from the vertical position of FIG. 3 to the position of FIG. 6. The point 72 of the belt 15 engages the pulley face 28 and moves the pulley section 26 in a clockwise direction. The shorter the minor axis becomes as rollers 47 and 49 move outwardly, the greater becomes the subtended angle of arc 75 and the point 72 approaches the axis 77, which is the axis of shaft 2. These factors cumulatively result in an increased angular speed of the pulley section 26.

The inventor claims:

1. In a variable ratio transmission mechanism: a pair of opposed non-rotary members having first tapered belt engaging surfaces, said first surfaces having a common axis, and the opposed tapers being outwardly converging; means resiliently urging one member toward the other member; a pair of rotary pulley sections having an axis coincident with said common axis and having second opposed tapered belt engaging surfaces, said second surfaces being outwardly diverging; said sections having outer edges adjacent the inner edges of the first tapered surfaces; a loop belt having tapered edges engaging both the first and second surfaces; one of said sections being a driven section and being axially movable; means resisting separation of the sections; and means for driving the belt comprising planetary rotary members contacting the inner surface of the belt loop, said rotary members being radially outwardly movable to cause the belt loop to assume an elliptic-like form, having edges contacting the first surfaces at opposite ends of the major axis of the loop, and the second surfaces at ends of the minor axis of the loop.

2. The combination as set forth in claim 1, with the addition of an adjusting means for limiting the axial movement of the axially movable member so as to predetermine the loop configuration.

3. The combination as set forth in claim 2, in which the adjusting means may optionally cause the belt loop to assume a circular form corresponding to zero speed of the belt loop and of the driven pulley section.

4. In a variable ratio transmission mechanism: a rotary driving member; a driven pulley structure having an axially fixed section and an axially movable section; means mounting said sections for rotation at the axis of the driving member and in opposed relationship; said sections having outwardly diverging opposed inclined surfaces; an edge-active belt in cooperative relation to said surfaces and forming a loop; said sections at their minimum separation shaping the belt into a circular loop; a circularly extending track surrounding the pulley structure; rotary means operated by the driving member for causing the belt to assume an elliptic-like form to engage and advance along the track at the ends of the major axis of the ellipse with the pulley structure engaging the belt along the minor axis of the ellipse; and means for varying the eccentricity of the ellipse.

5. In a variable ratio transmission mechanism: a rotary driving member; a driven pulley structure having an axially fixed section and an axially movable section; means mounting said sections for rotation at the axis of the driving member and in opposed relationship; said sections having outwardly diverging opposed inclined surfaces; an edge-active belt in cooperative relation to said surfaces and forming a loop; said sections at their minimum separation shaping the belt into a circular loop; said loop engaging the sections at outer portions of the opposed inclined surfaces; a pair of rotary elements having axes parallel to but spaced from the axis of the driving member and spaced one hundred eighty degrees apart, said axes being movable outwardly under the influence of centrifugal force to urge the belt loop into an ellipse-like form having a major and minor axis and to drive the belt; a pair of opposed non-rotary members having inclined surfaces that converge; one of the non-rotary members being yieldingly urged toward the other; said inclined surfaces on the non-rotary members encompassing the diverging opposed inclined surfaces; the belt having edge surfaces conformed to the inclined surfaces of the non-rotary members; said rotary elements when urged outwardly by centrifugal force, causing the yieldingly urged member apart from the other non-rotary member; and adjustable means for limiting the axial movement of the said yieldingly urged member.

6. In a variable ratio transmission mechanism: a driven pulley structure having sections with opposed inclined surfaces, at least one of the sections being yieldingly movable in an axial direction; a belt having edges engaging said surfaces; a rotary driving member coaxial with the pulley structure axis; said belt forming a closed loop which when in circular form is in contact with the outer portions of the inclined surfaces; a circularly extending track surrounding the pulley structure; means for coupling the driving member to the belt and for causing the belt to assume an ellipse-like form to engage and advance along the track adjacent the ends of its major axis and to engage the pulley sections adjacent the ends of the minor axis of the belt; and means to adjust the eccentricity of the loop, thereby to adjust the speed of the driven pulley structure.

7. The combination as set forth in claim 6, together with non-rotary members having opposed inclined faces from said track to contact the belt exteriorly of the pulley structure.

8. The combination as set forth in claim 6, together with non-rotary members having opposed inclined faces from said track to contact the belt exteriorly of the pulley structure; said coupling means including a pair of rotary planetary elements within the loop and urged centrifugally outwardly when the driving member is rotated.

9. In a transmission mechanism: means forming a circularly extending surface; an endless flexible belt having a circumference less than that of said surface; rotary driving means engaging the belt at a plurality of points spaced along the belt for causing the belt to track along the surface whereby the belt rotates in accordance with the differential length of the belt relative to said surface; and rotary driven means located within said circularly extending surface and engaged by the belt intermediate its tracking points for transmitting the rotation of the belt.

10. In a variable ratio transmission mechanism; means forming a circularly extending surface; an endless flexible belt having a circumference less than that of said surface; rotary driving means engaging the belt at a plurality of points spaced along the belt for causing the belt to track along the surface whereby the belt rotates in accordance with the differential length of the belt relative to said surface; means for adjusting the effective diameter of said surface; and rotary driven means located within said circularly extending surface and engaged by the belt intermediate its tracking points for transmitting the rotation of the belt.

11. In a transmission mechanism: a pair of non-rotary members having opposed coaxial substantially annular surfaces defining a wedge-shaped space converging outwardly; an endless flexible edge-active belt; rotary driving means engageable with the inside of the belt at a plurality of points spaced along the belt for causing the edge of the belt to track along said opposed substantially annular surfaces whereby the belt rotates in accordance with the differential length of the belt relative to the said surface; a variable diameter pulley structure located within and coaxially of said non-rotary members and engaged by the edges of the belt between its points of tracking; and shaft means mounting said pulley structure for rotation about its axis for transmitting the belt rotation.

12. In a variable ratio transmission mechanism: a pair of non-rotary members having opposed coaxial substantially annular surfaces defining a wedge-shaped space converging outwardly; an endless flexible edge-active belt; rotary driving means engageable with the inside of the belt at a plurality of points spaced along the belt for causing the edge of the belt to track along said opposed substantially annular surfaces whereby the belt rotates in accordance with the differential length of the belt relative to the said surface; a variable diameter pulley structure located within and coaxially of said non-rotary members and engaged by the edges of the belt between its points of tracking; shaft means mounting said pulley structure for rotation about its axis for transmitting the belt rotation; and means for adjusting the spacing of said non-rotary members to vary the effective circumference of said annular surfaces from a value equal to that of said belt to a value greater than that of said belt.

References Cited in the file of this patent
FOREIGN PATENTS
644,427    Germany _____ May 4, 1937